P. D. WESSON.
Evaporating Pan.
No. 36,926.
Patented Nov. 11, 1862.
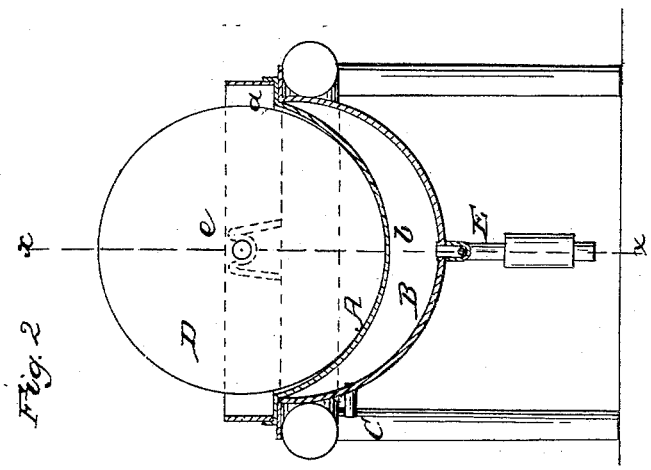
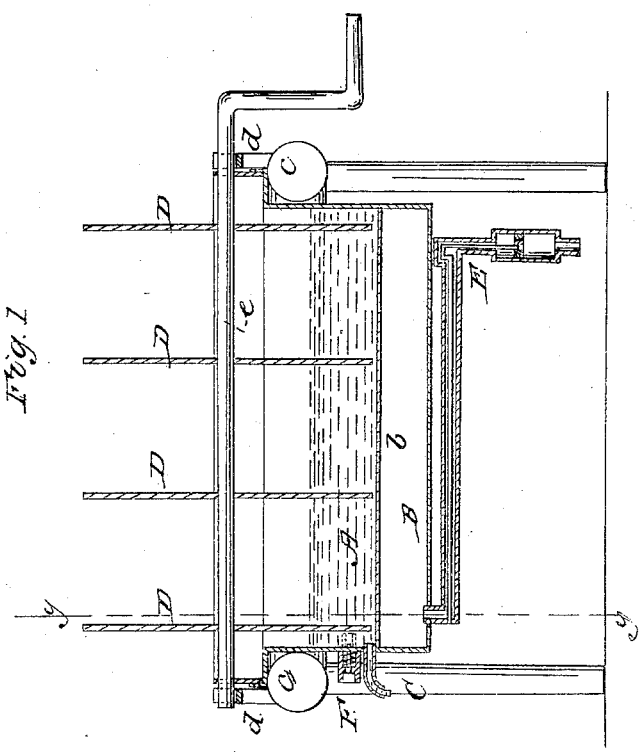
Witnesses
Geo. W. Reed
Timothy Shine
Inventor
P. D. Wesson
by Munn & Co
Attys.

UNITED STATES PATENT OFFICE.

PHINEAS D. WESSON, OF PROVIDENCE, RHODE ISLAND.

IMPROVEMENT IN EVAPORATORS FOR SACCHARINE AND OTHER LIQUIDS.

Specification forming part of Letters Patent No. 36,926, dated November 11, 1862.

*To all whom it may concern:*

Be it known that I, PHINEAS D. WESSON, of Providence, in the county of Providence and State of Rhode Island, have invented a new and Improved Evaporator for Saccharine Liquids, &c.; and I do hereby declare that the following is a full, clear, and exact description of the same, reference being had to the accompanying drawings, forming a part of this specification, in which—

Figure 1 represents a longitudinal vertical section of my invention, the line $x$ $x$, Fig. 2, indicating the plane of section. Fig. 2 is a transverse vertical section of the same, taken in the plane indicated by the line $y$ $y$, Fig. 1.

Similar letters of reference indicate corresponding parts in the two figures.

This invention relates to an improvement in that class of evaporators in which the liquid is heated by means of a steam-jacket and the evaporation facilitated by the action of a series of rotary disks.

The invention consists in the application to said steam-jacket of a steam-trap, the operation of which is based on the expansion and contraction of a metal bar or tube, caused by the rising or falling of the temperature of the medium surrounding the same or passing through it, in such a manner that by the action of said trap the temperature in the interior of the steam-jacket is not permitted to exceed certain limits either up or down, and consequently a burning or overheating of the liquid is avoided, and by maintaining a uniform temperature the evaporation is considerably facilitated.

To enable those skilled in the art to make and use my invention, I will proceed to describe its construction and operation with reference to the drawings.

A represents a pan or trough, made of sheet metal or any other suitable material, with a semicircular bottom, as plainly represented in Fig. 2 of the drawings. This pan rests, by means of flanges $a$, on a steam-jacket, B, the upper edges of which come close up to the corners under the side flanges of the pan, and the bottom of which is curved, so as to have a steam-space, $b$, under the pan A. The steam-jacket is suspended from a frame, C, the cross-bars $c$ of which support the journal-boxes $d$, which form the bearings for the shaft $e$ of a series of disks, D. These disks dip down into the liquid that may be poured into the pan A, and on imparting to the same a rotary motion they carry up some of the liquid on each revolution, and by spreading it over a large evaporating-surface facilitate the evaporation. The position of the disks in relation to the pans can be regulated by raising or lowering the journal-boxes $d$, or by shifting them on one side or on the other, as may be desirable; and in order to be able to accomplish this object it is requisite that the journal-boxes shall be secured by means of screw-bolts, or in any other convenient manner, to the frame C. Steam is admitted to the steam-jacket B by means of a suitable pipe, and by its action the contents of the pan A are heated. A steam-trap, E, which is applied to the steam-jacket, serves to regulate the temperature. This steam-trap is constructed with a bar or tube which connects by suitable levers with a valve, and which is exposed to the heat of the steam entering the steam-jacket, so that when the temperature in the interior of the jacket reaches a certain point the valve of the steam-trap closes, and if the temperature sinks down below a certain point the valve of the trap opens and the condensed water is allowed to discharge.

A vacuum-valve, F, may be attached to the side or end of the steam-jacket, to prevent its collapsing, if a sudden condensation of the steam in its interior should take place.

By the action of the steam-trap E the temperature of the steam-jacket can be kept within certain limits most favorable to effect the evaporation of the liquid, and the use of this steam-trap is of particular advantage in the evaporation of saccharine juices, which are liable to be burned when the heat rises beyond a certain point, and which at the same time require a certain temperature in order to effect the evaporation in the most favorable manner.

By the use of my improvement the temperature is maintained automatically at the desired point, and no attention must be paid to that, the most difficult part of the operation.

Having thus fully described my invention, what I claim as new, and desire to secure by Letters Patent, is—

The application of a steam-trap, E, to the steam-jacket B, when the latter is used in combination with an evaporating-pan, A, substantially as and for the purpose herein specified.

PHINEAS D. WESSON.

Witnesses:
 JAS. G. RAWSON,
 LEWIS P. MEAD.